United States Patent
Novoa, III et al.

(10) Patent No.: US 11,818,412 B2
(45) Date of Patent: Nov. 14, 2023

(54) METHODS AND SYSTEMS FOR SUPPLEMENTING SET-TOP BOX PROCESSING WITH ADDITIONAL PROCESSOR RESOURCES

(71) Applicant: DISH Network L.L.C., Englewood, CO (US)

(72) Inventors: Manuel Novoa, III, Highlands Ranch, CO (US); Kan Man Wong, Highlands Ranch, CO (US); Vishal Neeralike, Lone Tree, CO (US); Shiqiang Chu, Highlands Ranch, CO (US); Aram Semerjyan, Aurora, CO (US); Anthony Bond, Arvada, CO (US); Michael Song, Aurora, CO (US); Anthony Kallas, Aurora, CO (US); Derick Wong, Aurora, CO (US)

(73) Assignee: DISH Network L.L.C., Englewood, CO (US)

( * ) Notice: Subject to any disclaimer, the term of this patent is extended or adjusted under 35 U.S.C. 154(b) by 334 days.

(21) Appl. No.: 16/726,111

(22) Filed: Dec. 23, 2019

(65) Prior Publication Data
US 2020/0213670 A1 Jul. 2, 2020

Related U.S. Application Data

(60) Provisional application No. 62/786,111, filed on Dec. 28, 2018.

(51) Int. Cl.
*H04N 21/2662* (2011.01)
*H04N 21/418* (2011.01)
(Continued)

(52) U.S. Cl.
CPC ....... *H04N 21/2662* (2013.01); *H04N 21/222* (2013.01); *H04N 21/233* (2013.01);
(Continued)

(58) Field of Classification Search
CPC ............. H04N 21/2662; H04N 21/222; H04N 21/233; H04N 21/234; H04N 21/2402;
(Continued)

(56) References Cited

U.S. PATENT DOCUMENTS 8,200,527 B1 6/2012 Thompson et al.
9,082,092 B1 7/2015 Henry
(Continued)

*Primary Examiner* — Hitesh Patel
*Assistant Examiner* — Sujana Khakural
(74) *Attorney, Agent, or Firm* — Perkins Coie LLP

(57) ABSTRACT

Disclosed are methods for supplementing the processing capabilities of multimedia devices in a networked environment. A method can include providing a processing offloader module to physically connect to a first multimedia device in the networked environment. The offloader can be internal and/or external to the device. The method can include identifying the offloader, identifying a second multimedia device, and determining that a bandwidth of the second device falls below a threshold bandwidth. Instructions can be forwarded from the second device to the offloader when the bandwidth of the second device exceeds the threshold bandwidth. The offloader is configured to process the instructions and render multimedia information based on the instructions. A first communication can be transmitted to the second multimedia device indicating a request to enable a proxy configured to output received rendered multimedia information and the rendered multimedia information can be forwarded from the offloader to the second device.

12 Claims, 7 Drawing Sheets

(51) Int. Cl.
*H04N 21/222* (2011.01)
*H04N 21/24* (2011.01)
*H04N 21/44* (2011.01)
*H04N 21/234* (2011.01)
*H04N 21/233* (2011.01)
*H04N 21/439* (2011.01)
*H04N 21/431* (2011.01)
*H04N 21/436* (2011.01)
*H04N 21/442* (2011.01)
*H04N 21/443* (2011.01)
*H04N 21/61* (2011.01)
*H04N 21/45* (2011.01)

(52) U.S. Cl.
CPC ....... *H04N 21/234* (2013.01); *H04N 21/2402* (2013.01); *H04N 21/431* (2013.01); *H04N 21/436* (2013.01); *H04N 21/439* (2013.01); *H04N 21/4312* (2013.01); *H04N 21/44* (2013.01); *H04N 21/443* (2013.01); *H04N 21/44227* (2013.01); *H04N 21/44245* (2013.01); *H04N 21/4516* (2013.01); *H04N 21/6193* (2013.01)

(58) Field of Classification Search
CPC ............ H04N 21/431; H04N 21/4312; H04N 21/436; H04N 21/439; H04N 21/44; H04N 21/44227; H04N 21/44245; H04N 21/443; H04N 21/4516; H04N 21/6193
See application file for complete search history.

(56) References Cited

U.S. PATENT DOCUMENTS

| | | |
|---|---|---|
| 10,368,136 B1 | 7/2019 | Qureshi et al. |
| 2002/0067909 A1* | 6/2002 | Iivonen ............ H04N 21/6125 386/275 |
| 2004/0221305 A1* | 11/2004 | Broussard .......... H04N 21/2543 725/38 |
| 2005/0028208 A1 | 2/2005 | Ellis et al. |
| 2009/0093300 A1 | 4/2009 | Lutnick |
| 2012/0159555 A1 | 6/2012 | Minwalla |
| 2013/0007263 A1 | 1/2013 | Soroushian et al. |
| 2013/0024901 A1 | 1/2013 | Sharif-Ahmadi et al. |
| 2013/0116032 A1 | 5/2013 | Lutnick |
| 2013/0154812 A1* | 6/2013 | Richardson ............ G08C 19/00 340/12.52 |
| 2014/0082212 A1* | 3/2014 | Garg .................. H04N 21/2402 709/233 |
| 2014/0258747 A1* | 9/2014 | Narayan ............... G06F 1/3287 713/320 |
| 2015/0087371 A1 | 3/2015 | Hill |
| 2015/0089557 A1 | 3/2015 | Busse |
| 2015/0113554 A1 | 4/2015 | Stern |
| 2016/0014184 A1 | 1/2016 | Rehan et al. |
| 2016/0021007 A1* | 1/2016 | Shuman ................ H04L 67/104 370/235 |
| 2016/0027399 A1* | 1/2016 | Wilde ................... H04W 12/50 345/520 |
| 2016/0112732 A1 | 4/2016 | Li et al. |
| 2017/0050110 A1 | 2/2017 | Perry |
| 2017/0070757 A1 | 3/2017 | Phillips et al. |
| 2017/0188056 A1 | 6/2017 | Do et al. |
| 2017/0188060 A1 | 6/2017 | Major |
| 2017/0207976 A1* | 7/2017 | Rovner ............... H04M 1/724 |
| 2017/0346856 A1* | 11/2017 | Newell ............... H04L 63/0815 |
| 2018/0039519 A1* | 2/2018 | Kumar .................. G06F 9/4812 |
| 2018/0276352 A1* | 9/2018 | Yao ..................... G06F 21/6245 |
| 2018/0338170 A1 | 11/2018 | Stokking et al. |
| 2019/0073458 A1* | 3/2019 | McEwen ............... G06F 9/5005 |
| 2019/0116587 A1* | 4/2019 | Zhang ................. H04W 72/048 |
| 2019/0321725 A1 | 10/2019 | Zimrig et al. |
| 2020/0053430 A1 | 2/2020 | Burke et al. |
| 2020/0238175 A1 | 7/2020 | Smullen et al. |

* cited by examiner

METHODS AND SYSTEMS FOR SUPPLEMENTING SET-TOP BOX PROCESSING WITH ADDITIONAL PROCESSOR RESOURCES

CROSS REFERENCE TO RELATED APPLICATION

This application claims the benefit of U.S. Provisional Patent Application No. 62/786,111, entitled "METHODS AND SYSTEMS FOR DISCOVERY AND MANAGEMENT OF A PROCESSING OFFLOADER," and filed on Dec. 28, 2018, the disclosure of which is incorporated herein by reference in its entirety.

BACKGROUND

Multimedia devices may render multimedia content of various forms of media (e.g., audio, video, etc.). For example, a set top box may render audio and video content to an output device (e.g., television). In some cases, a multimedia device may receive instructions to update a user interface (UI), such as a guide or menu. A user may interface with the UI using a control device (e.g., remote control). For example, a user can view a menu that shows available channels/programs and actuate button(s) on a remote control to request an update to the menu.

In many cases, to render multimedia content, such as to update a UI, a multimedia device may receive instructions to render multimedia content from a remote node (e.g. a satellite, a remote server, etc.). The multimedia device may process the received instructions and render multimedia content onto an output device (e.g., a television, a speaker, etc.). In many cases, multiple multimedia devices may be included throughout a network environment (e.g., a home, a building, an office, etc.), and each multimedia device in the network environment may include a separate UI.

BRIEF DESCRIPTION OF THE DRAWINGS

Various features and characteristics of the technology will become more apparent to those skilled in the art from a study of the Detailed Description in conjunction with the drawings. Embodiments of the technology are illustrated by way of example and not limitation in the drawings, in which like references may indicate similar elements.

Figure 1:
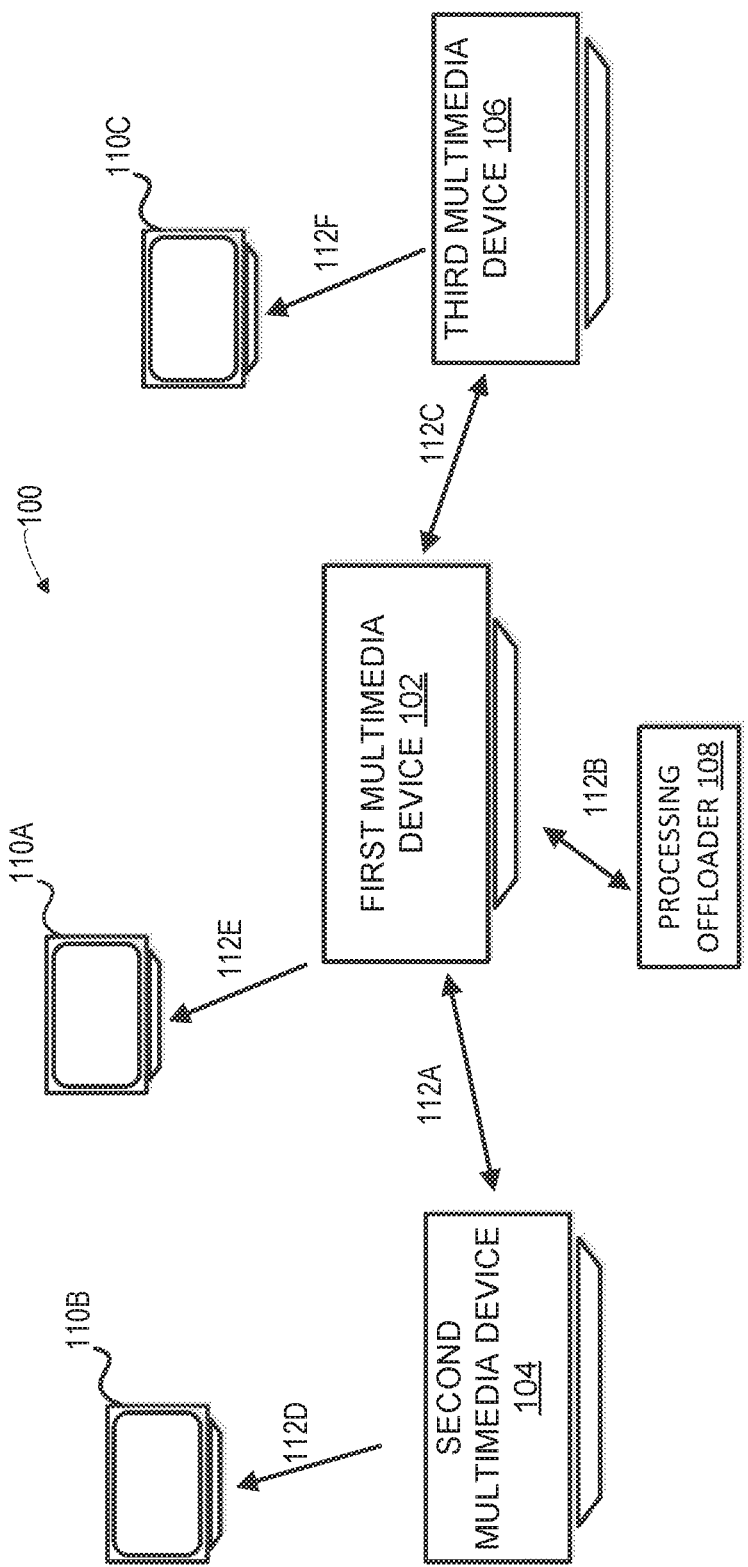
FIG. 1 depicts an illustration of a networked environment including multiple multimedia devices and a processing offloader, consistent with various embodiments.

The drawings depict various embodiments for the purpose of illustration only. Those skilled in the art will recognize that alternative embodiments may be employed without departing from the principles of the technology. Accordingly, while specific embodiments are shown in the drawings, the technology is amenable to various modifications.

DETAILED DESCRIPTION

Multimedia devices may be capable of rendering multimedia content, such as outputting video and audio to an output device (e.g., television). An example of such a multimedia device may include a set top box (STB), such as a Hopper® receiver or a Joey® receiver manufactured by Dish Network® L.L.C. The multimedia device may receive instructions to perform various functions relating to the rendering of multimedia content. Examples of such instructions may include user interface (UI) graphics rendering instructions, internet-browsing instructions, firmware update instructions, etc. Upon receipt of instructions, the multimedia device may process the instructions and render multimedia (e.g., graphics, audio, etc.) to an output device (e.g., television) based on the received instructions.

The multimedia device may receive an input by a remote-control device (e.g., remote control, mobile phone, etc.) indicating a request to generate and/or update a guide or menu (or "user interface") displayed on an output device. To handle this request, the multimedia device may request graphics rendering instructions from a remote node (e.g., satellite, server, etc.). In response, the multimedia device may receive graphics rendering instructions from the remote node and process the instructions to render information representing the updated UI based on the instructions.

In many cases, multimedia devices are manufactured in various iterations. For example, multiple iterations of a multimedia device may be designed and manufactured over a period of time. With each iteration of such multimedia devices, the computational resources (processing capacity, memory capacity, etc.) and functionality of the multimedia device may be increased. Accordingly, older (or "legacy") multimedia devices include fewer features and fewer computational resources than the more recently manufactured iterations of that multimedia device.

Updating a UI by processing sets of UI graphics rendering instructions may be computational-resource intensive. In other words, a large portion of available computational resources (e.g., processor, memory, etc.) may be exhausted to process UI graphics rendering instructions and render an updated UI based on such instructions. In some instances, when computational resources of a multimedia device are exhausted, a backlog of unprocessed instructions may develop and/or increase. This backlog of unprocessed and/or unrendered instructions may create a delay or increased latency in the updating of the UI. This delay may result in a lag in the output onto an output device (e.g., television) that may reduce user experience when viewing or interacting with the UI.

The present disclosure relates to discovering and managing one or more processing offloaders (or "co-processors") in a networked environment. A processing offloader may handle processing capabilities on behalf of one or more multimedia device in a networked environment. For example, a multimedia device may forward UI graphics instructions to the processing offloader, and the processing offloader can process the instructions and send the rendered UI graphics to the multimedia device.

Accordingly, the processing offloader may process (or "offload") computationally-intensive instructions on behalf of multimedia device(s) and transmit the rendered multimedia to the multimedia device(s). Utilizing a processing offloader to process computationally-intensive instructions may reduce the computational resources demanded by multimedia device(s), particularly with legacy multimedia devices. Utilizing the processing offloader may reduce latency in modifying/updating the UI and increase the efficiency of the computational resources of the multimedia devices in the networked environment.

System Overview

FIG. 1 depicts an illustration of a networked environment 100 including multiple multimedia devices 102, 104, 106 and a processing offloader 108, consistent with various embodiments. As shown in FIG. 1, a first multimedia device 102, a second multimedia device 104, and a third multimedia device 106 is included in a networked environment 100. However, any number of multimedia devices may be included in the networked environment 100. Furthermore, any suitable number of processing offloaders may be used.

Multimedia devices 102, 104, 106 can include any network-accessible device configured to process and render multimedia data. For example, the multimedia device 102, 104, 106 may include a set top box configured to render multimedia (e.g., audio, video, etc.) to an output device (e.g., television, speaker, etc.). In some embodiments, the multimedia devices 102, 104, 106 are configured to process and render user interface (UI) graphics rendering instruction(s) to generate and/or update a UI specific to a multimedia device.

Within the networked environment 100, a multimedia device can serve as a primary multimedia device for the networked environment 100. For example, the first multimedia device 102 may be a primary multimedia device. As primary multimedia device, first multimedia device 102 communicates with a remote node (e.g., satellite, external server, etc.) and forwards information between the connected device(s) within the networked environment 100. In some embodiments, the primary multimedia device (e.g., first multimedia device 102) may include greater computational (e.g., CPU, memory) resources and additional functionality than the other multimedia device(s) in the networked environment 100.

One or more secondary multimedia devices (e.g., second multimedia device 104, third multimedia device 106) may connect to the first multimedia device 102. The second multimedia device 104 may communicate with a remote node (e.g., satellite, external server, etc.) via the first multimedia device 102, where the first multimedia device 102 forwards information between the remote node and the second multimedia device 104.

In some embodiments, a multimedia device 102, 104, 106 includes a computing device that includes instructions to execute at least some functionality of a multimedia device (or a "thin client"). The thin client may rely on another computing device, such as a server, video game console, desktop computer, etc., to perform computationally-intensive processes and execute the instructions to perform functionality of a multimedia device. The thin client may perform some or all functionality of a multimedia device as described herein.

Devices within the networked environment 100 can communicate via an interconnect 112A-F. An interconnect 112A-F may include one or more wired or wireless networks, including personal area networks (PANs), local area networks (LANs), wide area networks (WANs), metropolitan area networks (MANs), cellular networks, the Internet, etc. In some embodiments, an interconnect (e.g., interconnect 112A, 112C) may utilize coaxial communication protocols (e.g., the Multimedia Over Coaxial Alliance (MOCA)™ protocol) to communicate between multimedia devices. In some embodiments, interconnect 112B may connect to the first multimedia device 102 via a universal serial bus (USB) connection.

In some embodiments, a multimedia device 102, 104, 106 may include multiple communication channels (e.g., Wi-Fi, MOCA™, etc.). In these embodiments, a multimedia device 102, 104, 106 may transmit information via one or more of the multiple communication channels, where the multimedia device can balance information transmission across each communication channel based on the bandwidth availability of each channel. For example, in a dual-channel interconnect utilizing a MOCA™ coaxial channel and Wi-Fi wireless channel, the multimedia device may determine a channel (e.g., MOCA™ or Wi-Fi) to transmit information. In another example, a multimedia device may regulate or otherwise control transmission across its own communication channel(s) and one or more communication channel(s) of other multimedia devices.

In some embodiments, the transmission of information between the first multimedia device 102 and the processing offloader 108 is encrypted. The first multimedia device 102 may encrypt information and transmit the encrypted information to the processing offloader via interconnect 1128. Examples of encryption techniques may include Triples Data Encryption Standard (DES), RSA public-key encryption, advanced encryption standard (AES), etc. In some embodiments, the information is transposed before transmission to the processing offloader 108. Upon receipt of the encrypted information, the processing offloader 108 decrypts the encrypted information. The processing offloader 108 can encrypt the graphics data or processed information using the same or a different encryption technique and transmit the encrypted information to the first multimedia device 102.

In some cases, to update the UI of a multimedia device (e.g., first multimedia device 102), the multimedia device receives an input from a remote device (e.g., a remote control input responsive to an actuation of a button on the multimedia device) within the networked environment, where the input indicates a request to update the UI. In other cases, the UI of a multimedia device may be updated programmatically (e.g., upon satisfying a conditional test, upon satisfying a temporal threshold, upon pre-loading background or predicted content, etc.), without necessarily requiring an input from the remote device. In response, a multimedia device (e.g., first multimedia device 102) transmits a request for UI graphics rendering instruction(s) to a remote node (e.g., satellite), where the multimedia device receives the UI graphics rendering instruction(s) from the remote node. The multimedia device (e.g., first multimedia device 102) processes the received UI graphics rendering instruction(s) and renders the updated UI via an output device (e.g., television 110A).

A processing offloader 108 may perform processing operations on behalf of multimedia device(s) 102, 104, 106 in the networked environment 100. In an embodiment, the processing offloader 108 receives instructions (e.g., UI graphics rendering instructions) from multimedia device(s) 102, 104, 106, and processes such instructions on behalf of the multimedia device(s) 102, 104, 106. In some embodiments, the processing offloader 108 receives instructions from a multimedia device 102, 104, 106 based on a determination that available processing resources (or "bandwidth") of a multimedia device 102, 104, 106 has fallen below a threshold amount of available processing resources (or "threshold bandwidth").

In embodiments, the processing offloader 108 generates a UI on behalf of a multimedia device 102, 104, 106. For example, the processing offloader 108 can process the UI graphics rendering instructions and transmit the rendered UI graphics information to the appropriate multimedia device 102, 104, 106. One or more UIs can be generated/maintained at the processing offloader 108, where each UI is associated with a multimedia device 102, 104, 106 in the networked environment 100. In an embodiment, the processing offloader 108 creates a unique and/or separable processing instance or thread for each UI associated with the multimedia device 102, 104, 106 in the networked environment 100.

Figure 2:
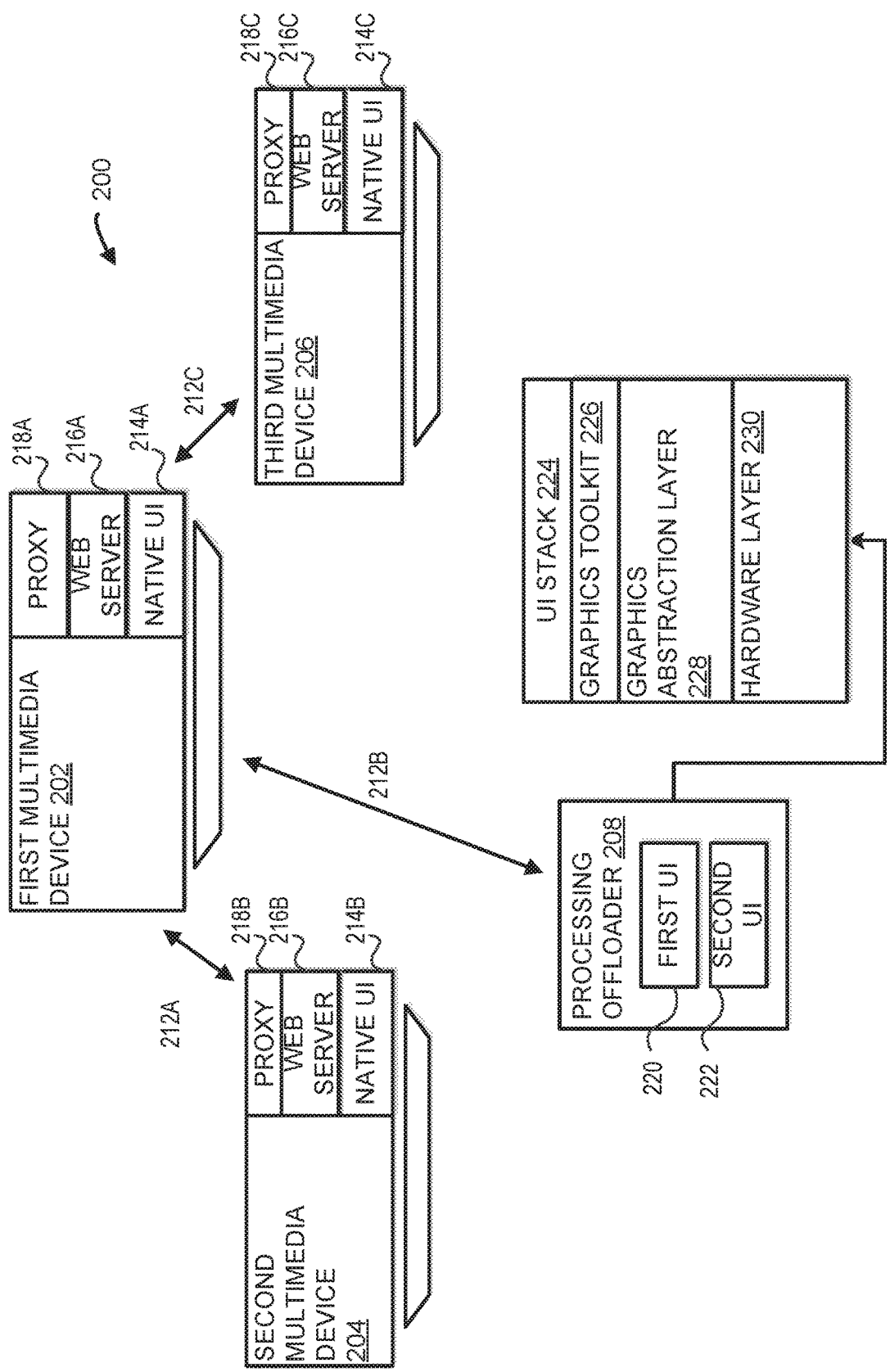
FIG. 2 depicts an illustration of a networked environment, consistent with various embodiments.

FIG. 2 depicts an illustration of a networked environment 200, consistent with various embodiments. As shown in FIG. 2, each multimedia device 202, 204, 206 includes multiple processes, such as a native UI 214A-C, a web server 216A-C, a proxy 218A-C, etc.

A native UI 214A-C may include a set of rendered graphics configured to execute on a multimedia device. For example, the rendered graphics included in a native UI 214A-C may include a menu or guide outputted onto an output device (e.g., television). Each native UI 214A, 214B, 214C may include a separate set of rendered graphics.

A web server 216A-C may include processes to interact with and render results from devices within a public or private network. The web server 216A-C may utilize an interface (e.g., common gateway interface (CGI)) to interface with executable programs on remote devices (e.g., servers) over an internet connection. For example, the web server 216A-C may transmit a request for information over an internet network, where network devices in the internet network forward the request for information to the appropriate remote device. The web server 216A-C may receive the requested information from the remote device via the internet network. The received information may be processed at the web server 216A-C and rendered as a portion of the UI.

A proxy 218A-C may include a proxy server configured to act as an intermediary for a remote UI executing on the processing offloader 208. For example, the proxy 218A running on the first multimedia device 202 may output rendered processing instructions received by a first UI 220 executing on the processing offloader 208. In some embodiments, the proxy 218A-C may run or execute as a substitute for the native UI 214A-C or upon the native UI 214A-C shutting down. In some embodiments, the proxy 218A-C may be executed on a hypervisor/virtual machine on the multimedia device 202, 204, 206.

In some embodiments, one or more of the multimedia device(s) 202, 204, 206 may include a virtual network. A virtual network may include an interface to facilitate communication between the multimedia device and a remote computing device, such as a mobile device or a desktop computer. The virtual network may utilize virtual network computing (VNC) to facilitate this connection to a remote computing device, where the remote computing device may access and/or control some or all functionality of the multimedia device. In some embodiments, the virtual network facilitates a graphical sharing system that may utilize a remote frame buffer to remotely control the device from the remote computing device. In an embodiment, a computer program (or "application") executing on a mobile phone may access the multimedia device via a virtual network.

As shown in FIG. 2, the processing offloader 208 may include one or more UIs 220, 222 executing on the processing offloader 208. In some embodiments, the processing offloader 208 executes a first UI 220 as a UI for the first multimedia device 202 and a second UI 222 as a UI for the second multimedia device 204. One or more UIs may be executed by the processing offloader 208.

In some embodiments, a UI 220, 222 is executed on a processing offloader 208 based on determining that a multimedia device exceeds a threshold processing capacity range. In other words, if a bandwidth of a multimedia device falls below a threshold bandwidth, the processing offloader 208 may generate a UI and process graphics instructions on behalf of the multimedia device. Utilizing the processing offloader 208 may lessen computational demand on a multimedia device while maintaining low latency for the multimedia device.

For example, the processing offloader 208 may generate a first UI 220 to execute a UI on behalf of the first multimedia device 202. In this event, the native UI 214A of the first multimedia device 202 may be shut down or disabled. The proxy 218A of the first multimedia device may be enabled, where the proxy 218A may be configured to received rendered graphics instructions for the first UI 220 and output the rendered first UI 220 to an output device.

A second multimedia device 204 native UI 214B may be shut down with the processing offloader executing a second UI 222 using some or all techniques as described with the first multimedia device 202. In some embodiments, rendered graphics associated with the second UI 222 may be transmitted from the processing offloader 208 to the second multimedia device 204 via first multimedia device 202. The first multimedia device 202 may forward the rendered graphics associated with the second UI 222 based on identifying the second multimedia device 204 as the recipient of the rendered graphics. The proxy 2188 associated with the second multimedia device 204 may receive the rendered graphics and output the rendered graphics.

In some embodiments, the first multimedia device 202 may synchronize the execution of instructions between the processing offloader 208 and any multimedia device(s) 202, 204, 206. In other embodiments, the processing offloader and/or any multimedia device 202, 204, 206 may synchronize the execution of instructions.

For purposes of illustration, a second UI 222 is started to process and render information on behalf of second multimedia device 204. In this embodiment, the proxy 2188 executing on the second multimedia device 204 and the second UI 222 of the processing offloader 208 may be synchronized to optimize the flow of information and the rendering of graphics. Synchronizing the second UI 222 and the proxy 2188 may include matching or synchronizing the internal clocks of each of the processing offloader 208 and the second multimedia device 204. In some embodiments, the first multimedia device 202 forwards information between the processing offloader 208 and the second multimedia device 204. In these embodiments, the first multimedia device 202 may forward instructions and information between the processing offloader 208 and the second multimedia device 204 in such a manner so that the flow of information is synchronized. For example, the first multimedia device 202 may wait to transmit the instructions to the processing offloader 208 until rendered graphics information is received at the first multimedia device 202 from the processing offloader 208.

As shown in FIG. 1, the processing offloader 208 may include a UI stack 224. The UI stack 224 may be included in executing the first UI 220 and/or the second UI 222. The UI stack 224 may include a set of instructions that facilitate operation of the UI.

The UI stack 224 may include a graphics toolkit 226. The graphics toolkit 226 may include an application framework and toolkit for creating and/or modifying multimedia, such as graphical user interfaces. An example of a graphics toolkit 226 may include QT. In some embodiments, the UI stack 224 may include an application programming interface (API) to render graphics. An example of such a API may include open graphics library (OpenGL) for rendering vector graphics.

The UI stack 224 may include a graphics abstraction layer 228. The graphics abstraction layer 228 may be a layer to shield or hide the working details of the graphics processes. This may allow for the separation of concerns to facilitate interoperability of the UI stack 224.

The UI stack 224 may include a hardware layer 230. The hardware layer 230 may include the physical chipset layer of the processing offloader 208. The processing offloader 208 may include a processor that includes one or more cores.

Management of Processing Offloader

Figure 3:
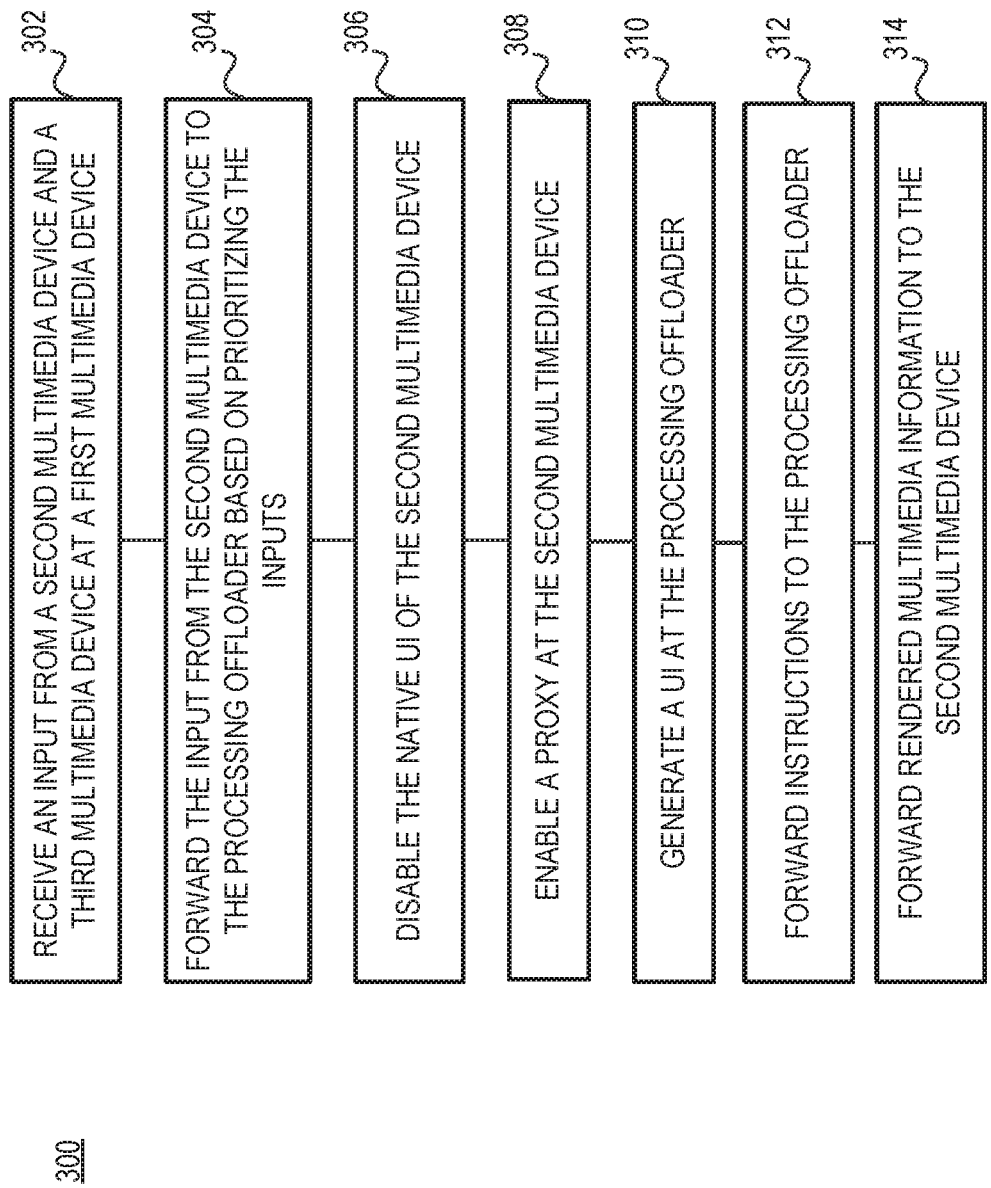
FIG. 3 depicts a flow process illustrating a method to utilize a processing offloader, consistent with various embodiments.

FIG. 3 depicts a flow process 300 illustrating a method to utilize a processing offloader, consistent with various embodiments. A processing offloader may perform UI processing and rendering functionality for at least some of the multimedia device(s) in the networked environment.

The first multimedia device may receive one or more inputs for the processing offloader to handle UI graphics rendering instruction(s) on behalf of a multimedia device (block 302). In an embodiment, an input from a second multimedia device and an input from the third multimedia device may be received at the first multimedia device. Each input received may include information identifying the multimedia device and, in some embodiments, the input may include UI graphics rendering instruction(s).

The first multimedia device may forward the input from the second multimedia device to the processing offloader based on prioritizing the inputs received (block 304). In an embodiment, forwarding the input may include forwarding instructions to render multimedia information (e.g., an updated UI) to the processing offloader. Prioritizing inputs may allow for a multimedia device with less available bandwidth to have processing functionality offloaded onto the processing offloader, lessening processing demand and reducing any potential latency at the multimedia device. Prioritizing the requests is discussed in greater detail with reference to FIG. 4.

The native UI of the second multimedia device may be disabled (block 306). As noted above, a native UI is a UI executing on a multimedia device, and the native UI may be disabled upon determining that the processing offloader can render multimedia information on behalf of the multimedia device. In some embodiments, the native UI of the second multimedia device may be shut down upon the input from the second multimedia device being forwarded to the processing offloader. Shutting down the native UI may include disabling the UI and no longer processing graphics rendering instruction(s) relating to the UI.

A proxy may be enabled on a multimedia device (e.g., second multimedia device) (block 308). In some embodiments, the proxy of the second multimedia device may be enabled upon the input from the second multimedia device being forwarded to the processing offloader. As noted above, the proxy may be configured to receive rendered graphics representing a UI and/or an updated UI, and the proxy can output the rendered UI to an output device.

In some embodiments, the first multimedia device may transmit a communication to the second multimedia device requesting the second multimedia device to disable the native UI and to enable the proxy. The communication may be transmitted when it is determined that the processing offloader can handle the UI processing and rendering functionality on behalf of the second multimedia device.

The processing offloader may generate a UI for multimedia device(s) based on receiving an input from the multimedia device (block 310). For example, in an embodiment, a UI may be generated at the processing offloader on behalf of a second multimedia device based on the receipt of an input transmitted by the second multimedia device. The UI generated at the processing offloader may be configured to process UI graphics rendering instruction(s) and render UI graphics based on the instruction(s) received.

A multimedia device (e.g., first multimedia device) may forward instructions to the processing offloader (block 312). In some embodiments, instructions received by the processing offloader may include UI graphics rendering instruction(s) relating to a UI. In some embodiments, instructions may be transmitted from a second multimedia device to the processing offloader via a first multimedia device. The first multimedia device may receive the first graphics rendering instruction from a second multimedia device via an interconnect (e.g., MOCA™ connection) and forward the first graphics rendering instruction to the processing offloader.

Upon receipt of the first graphics rendering instruction, the processing offloader may process the first graphics rendering instruction and generate graphics data based on the processed instruction. The processing offloader may process multiple graphics rendering instructions that represent a UI or an updated UI of a multimedia device.

The second multimedia device may receive rendered multimedia information representing an updated UI from the processing offloader (block 314). The first multimedia device may forward the multimedia information from the processing offloader to the second multimedia device. Upon receipt of the rendered multimedia information, the proxy of the of the multimedia device (e.g., second multimedia device) may render a UI and output the rendered UI to an output device.

Figure 4:
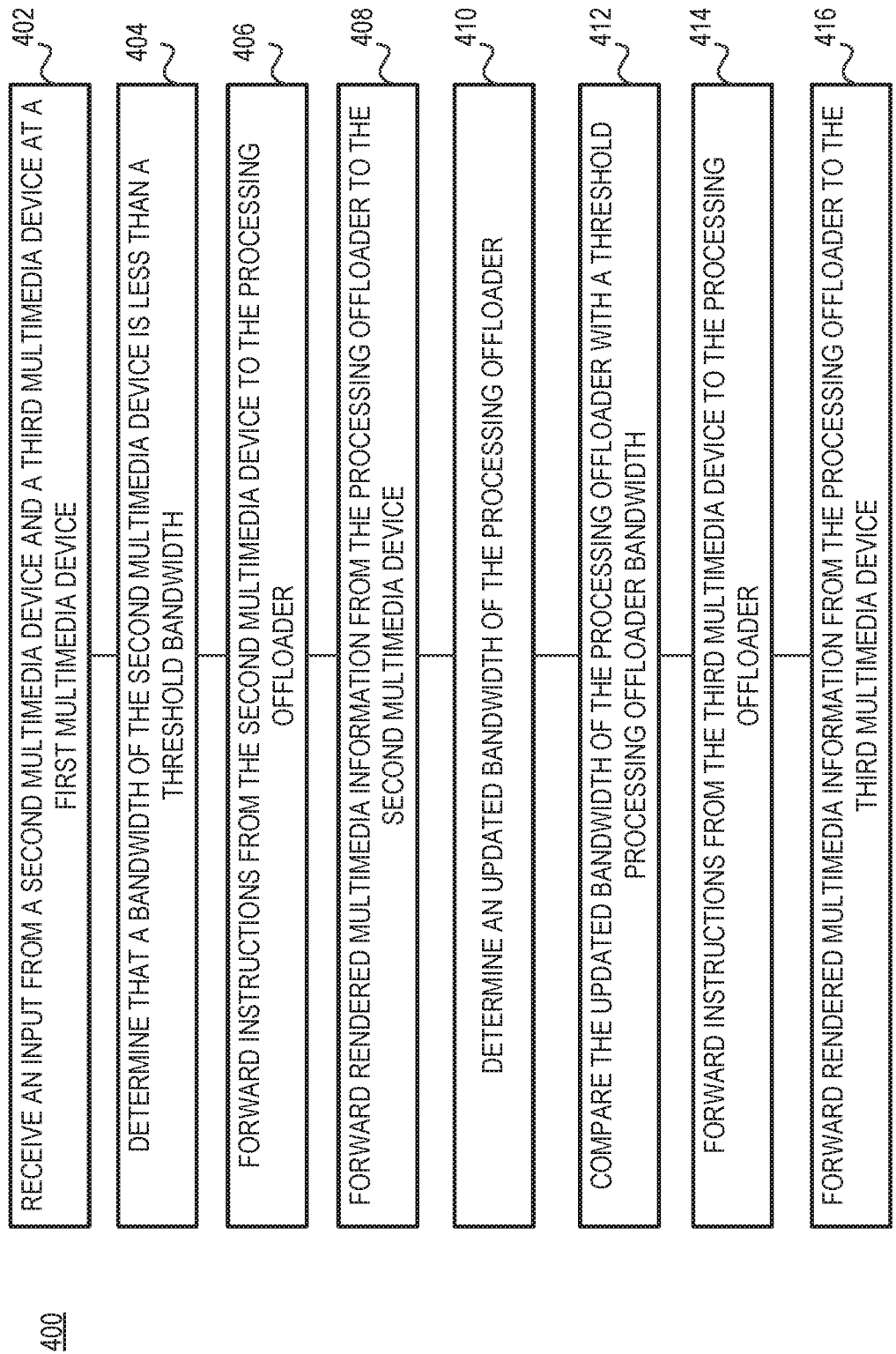
FIG. 4 depicts a flow process for managing a processing offloader, consistent with various embodiments.

FIG. 4 depicts a flow process for managing a processing offloader, consistent with various embodiments. Managing the processing offloader may include prioritizing inputs to dictate the order in which the inputs are forwarded to the processing offloader. Determining a priority to forward inputs to the processing offloader may ensure that the processing offloader can process and render UI graphics on behalf of multimedia device(s) with low latency.

As noted above, a first multimedia device may receive inputs from one or more multimedia devices, e.g., an input from a second multimedia device and an input from a third multimedia device (block 402).

A first multimedia device may determine that the available processing resources (or bandwidth) of a second multimedia device falls below a threshold bandwidth (block 404). In other words, if a multimedia device is closer to its maximum bandwidth so that it exceeds a threshold level, the multimedia device may be vulnerable to increased latency/delay, and the processing offloader may handle processing functionality on behalf of the processing offloader.

The bandwidth of the processing offloader may include available processing resources of a multimedia device. In an embodiment, the first multimedia device may determine the bandwidth of a device (e.g., second multimedia device, processing offloader) by inspecting the interconnect connecting the first multimedia device and the device. In some embodiments, the first multimedia device may determine the bandwidth by comparing a measured/identified bandwidth over the interconnect with a known maximum bandwidth of the device.

In some embodiments, the first multimedia device may receive information from the processing offloader indicating the processing resources utilized by the processing offloader. In an embodiment, processing capacity may be expressed in Million instructions per second (MIPS), a measure of the raw speed of processing resources of a device. For example, a first multimedia device may receive a message indicating a processing resource utilization of a second multimedia device that is 5K MIPS, and a maximum processing capacity of 20K MIPS.

The bandwidth of the second multimedia device may be compared against a threshold bandwidth. The threshold bandwidth may include a known or predetermined bandwidth that represents the maximum utilization of processing resources of a device before some or all processing functionality is offloaded onto a processing offloader.

For example, if the maximum processing capacity of the processing offloader is 20K MIPS, and 3K MIPS is the processing resources utilized by the processing offloader, then 17K MIPS is the available processing resources for the processing offloader. The difference between the utilized processing resources (3K MIPS) and the maximum processing resources (20K MIPS) of a device may be illustrated as a differential (17K MIPS). Furthering this example, if the threshold bandwidth is 5K MIPS, the differential (17K MIPS) is greater than the threshold bandwidth (5K MIPS). This may illustrate that there is sufficient processing resources for the device to handle processing functionality itself.

In a second example, if the maximum processing capacity of the processing offloader is 20K MIPS, and 17K MIPS is the processing resources utilized by the processing offloader, then 3K MIPS is the available processing resources for the processing offloader. If the threshold bandwidth is 5K MIPS, the available processing resources of the device (3K MIPS) is less than the threshold bandwidth (5K MIPS). This may illustrate that the device is close to its maximum processing capacity, and the processing offloader can handle the processing functionality on behalf of the device to prevent an increased latency/delay in processing and rendering multimedia content.

In some embodiments, the first multimedia device may compare the bandwidth among multiple devices. For example, a first multimedia device may compare the bandwidth of a second multimedia device (e.g., 2K MIPS) and a third multimedia device (e.g., 4K MIPS). In this example, the second multimedia device (2K MIPS) has less available processing resources than a third multimedia device (4K MIPS). Accordingly, in the example, the second multimedia device may be prioritized and have the processing offloader handle processes on behalf of the second multimedia device ahead of the third multimedia device.

The first multimedia device may prioritize the input from the second multimedia device and forward instructions from the second multimedia device to the processing offloader (block 406). Once received at the processing offloader, the processing offloader may generate a second UI and perform processing and rendering of UI graphics rendering commands for the UI of the second multimedia device.

The first multimedia device may forward rendered multimedia information from the processing offloader to the second multimedia device (block 408). The rendered multimedia information may represent processed instructions received from the second multimedia device and the rendered multimedia information may represent graphics for an updated UI.

With the processing offloader handling processes on behalf of the second multimedia device, the first multimedia device may determine whether the processing offloader can handle processes on behalf of a subsequent device (e.g., the third multimedia device).

The first multimedia device may determine an updated bandwidth of the processing offloader (block 410). The updated bandwidth of the processing offloader may include the available processing resources of the processing offloader that includes the UI graphics rendering instructions from the second multimedia device and the rendered UI graphics transmitted from the processing offloader. The updated bandwidth may be used in determining whether a subsequent set of instructions from another device (third multimedia device) can be forwarded to the processing offloader without increased latency by the processing offloader. In an embodiment, the updated bandwidth may be determined by comparing a bandwidth of the processing offloader with a maximum processing capacity of the processing offloader.

The first multimedia device may compare the updated bandwidth of the processing offloader with a threshold processing offloader bandwidth (block 412). In other words, the first multimedia device may determine whether the processing offloader has the bandwidth to handle processing and rendering processes for a subsequent multimedia device. If the updated bandwidth of the processing offloader exceeds a threshold processing offloader bandwidth, the processing offloader may handle the processes for the third multimedia device.

The threshold processing offloader bandwidth may be a predetermined threshold level of available processing resources of the processing offloader. In some embodiments, the threshold processing offloader bandwidth may be the amount of processing resources to perform the processing of instructions for the third multimedia device.

As an example, a utilized bandwidth of a processing offloader may be determined to be 5K MIPS, and a maximum bandwidth of the processing offloader is 20K MIPS. Accordingly, the bandwidth differential of the processing offloader is 15K MIPS. If a threshold processing offloader bandwidth is 3K MIPS, the bandwidth differential of the processing offloader (15K MIPS) is greater than the threshold processing offloader bandwidth (3K MIPS) and the processing offloader can handle processes for a multimedia device.

The first multimedia device may forward instructions from the third multimedia device to the processing offloader based on determining that the updated bandwidth of the processing offloader exceeds the threshold processing offloader threshold (block 414). In response, the processing offloader may generate a UI to handle processing capabilities on behalf of the third multimedia device. In an embodiment, the first multimedia device may forward instructions from the first multimedia device to the processing offloader using the techniques as described herein.

The first multimedia device may forward rendered multimedia information from the processing offloader to the third multimedia device (block 416). The process as described herein may be repeated for multiple multimedia devices. In some embodiments, the above-described techniques may be repeated for subsequent multimedia devices until the bandwidth of the processing offloader cannot process and render UI graphics commands without increased latency and/or delay.

Discovery of Processing Offloader

As shown in FIG. 1, a networked environment may include a processing offloader configured to handle processing instructions on behalf of multimedia device(s) in the networked environment. In some embodiments, the processing offloader may connect to a multimedia device (e.g., first multimedia device as shown in FIG. 1) via an interconnect.

In some cases, a multimedia device (e.g., first multimedia device) may discover and identify the processing offloader when the processing offloader is connected to the networked environment. Upon discovering and identifying the processing offloader, a multimedia device may determine whether to offload UI processing functionality to the processing offloader.

However, for a variety of reasons, the multimedia may need to re-discover the processing offloader. For example, if a multimedia device is rebooted, the multimedia device may re-discover all devices connected to the multimedia device, including the processing offloader.

Figure 5:
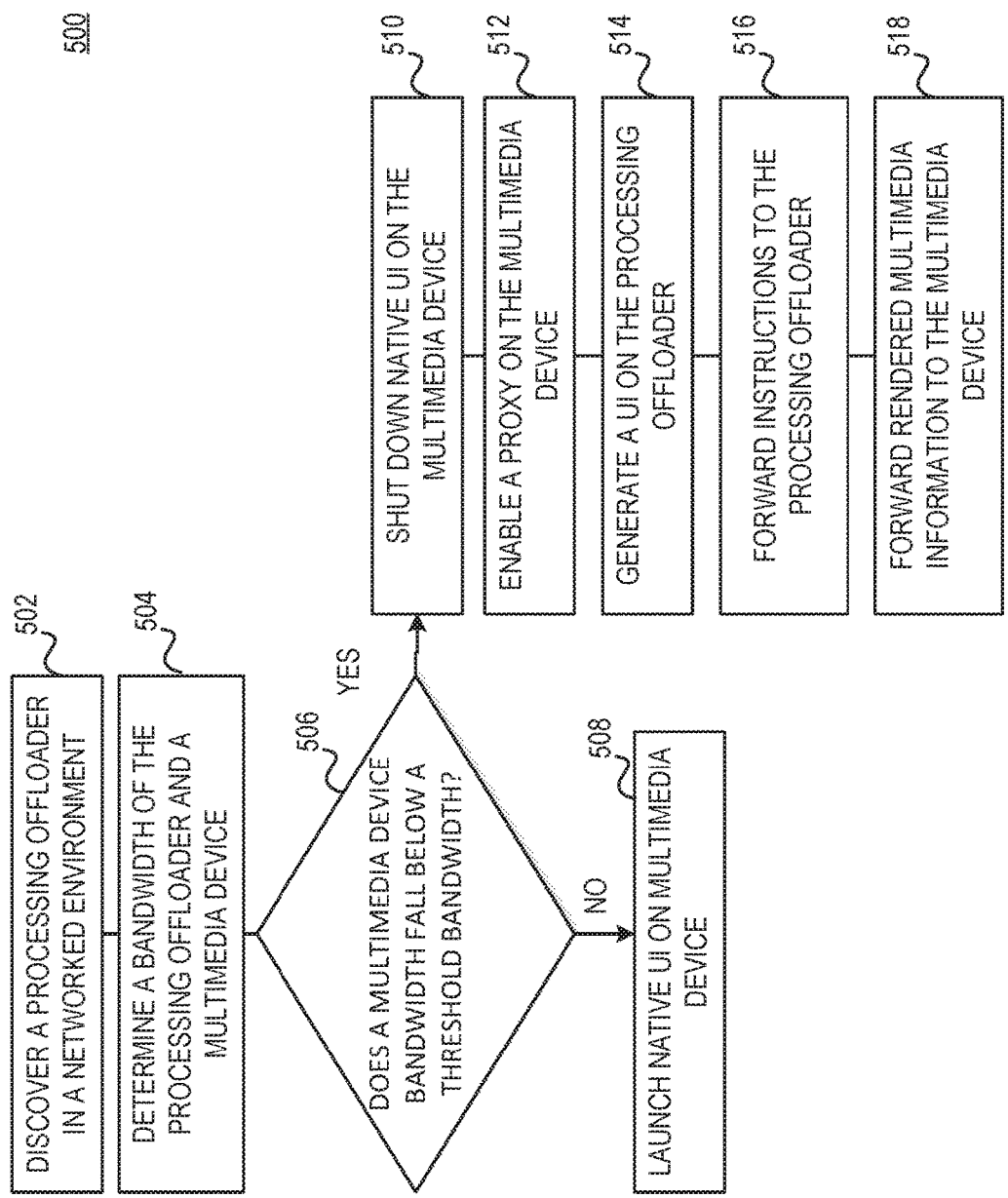
FIG. 5 depicts a flow process illustrating a method to process information using a processing offloader in a networked environment, consistent with various embodiments.

FIG. 5 depicts a flow process 500 illustrating a method to discover a processing offloader in a networked environment, consistent with various embodiments.

A multimedia device may discover a processing offloader in the networked environment (block 502). A networked environment may include multiple multimedia devices, where a first multimedia device discovers a processing offloader connected to the network environment via an interconnect. In some embodiments, a multimedia device may inspect all interconnects to determine whether a device (e.g., processing offloader, a second multimedia device, etc.) is connected to the multimedia device via the interconnect.

In some embodiments, a first multimedia device may transmit a request to all devices connected to the first multimedia device via interconnect(s). In response, each connected device, such as a processing offloader, may transmit a response to the request, where the response includes information identifying the device. Examples of information identifying the device may include a serial number, model number, current firmware iteration, etc. In some embodiments, the response identifying the device may include processing capacity and/or bandwidth of the device (e.g., processing offloader).

In some embodiments, a multimedia device (e.g., first multimedia device) may synchronize device(s) within the networked environment. For example, a first multimedia device may synchronize communication of information between a second multimedia device and the processing offloader. Such synchronizing may occur upon discovery of a processing offloader or upon startup of the multimedia device and/or the processing offloader. In some embodiments, a multimedia device may synchronize the communication between a proxy executing on the multimedia device and a first UI executing on the processing offloader.

In some embodiments, synchronizing may include the first multimedia device forwarding UI graphics rendering instructions to the UI of the processing offloader and forwarding the rendered graphics data to a proxy on the second multimedia device in sync with one another. In other words, the timing of the forwarding of information between the second multimedia device and the processing offloader may be synchronized so that information is received at each device at specified times. In other embodiments, an internal timer/clock of the second multimedia device and the processing offloader may be synchronized.

The first multimedia device may determine the bandwidth of the processing offloader and a multimedia device (block 504). In some embodiments, the first multimedia device may inspect the interconnect between the first multimedia device and the processing offloader to determine the bandwidth available at the processing offloader. The bandwidth may be determined by determining the processing resources utilized by the processing offloader against a maximum processing capacity of the processing offloader. If the processing offloader has bandwidth available for additional processing capability, at least one of the multimedia device UIs in the networked environment may be processed on the processing offloader.

In some embodiments, the first multimedia device may determine a bandwidth of each multimedia device within the networked environment. For example, the first multimedia device may inspect the interconnect(s) of the second multimedia device to determine the available bandwidth for the second multimedia device. The first multimedia device may determine the amount of available processing capacity (or bandwidth) of the second multimedia device. In some embodiments, each multimedia device (e.g., second multimedia device) may determine its available processing resources by inspecting the processing utilization (e.g., the exhausted processing resources compared to the maximum processing resources) and reporting the processing capacity to one of the first multimedia device and the processing offloader.

The first multimedia device may determine whether a multimedia device bandwidth falls below a threshold bandwidth (block 506). The first multimedia device may compare the processing resources or bandwidth for a multimedia device (e.g. second multimedia device) against a threshold bandwidth to determine whether the processing offloader should handle processing capabilities for that multimedia device.

For example, the first multimedia device may determine that the second multimedia device bandwidth is 3K MIPS (or 75%) of its maximum processing capacity of 4K MIPS. In this example, if the threshold bandwidth is 2K MIPS (or 50% of the maximum bandwidth), the second multimedia device processing instructions may be processed and rendered by the processing offloader, as the second multimedia device available processing resources is close to its maximum bandwidth.

In some embodiments, if it is determined that a multimedia device (e.g., second multimedia device) has a bandwidth that exceed the threshold bandwidth, the native UI on the multimedia device executes processing capabilities to process the instructions and render updated UI graphics (block 508).

The native UI of a multimedia device (e.g., second multimedia device) may be shut down (or disabled) based on determining that the processing resources of the multimedia device exceeds the threshold bandwidth (block 510). Shutting down the native UI may include disabling the UI and no longer processing graphics rendering instruction(s) relating to the UI. With the native UI disabled, the multimedia device (e.g., second multimedia device) may transmit all future graphics rendering instructions relating to the UI to the processing offloader.

A proxy may be enabled on a multimedia device (e.g., second multimedia device) based on determining that the processing utilization of the multimedia device exceeds the threshold bandwidth (block 512). As noted above, the proxy may be configured to receive rendered graphics representing a UI and/or an updated UI, and the proxy can output the rendered UI to an output device.

The processing offloader may generate a UI for the second multimedia device (block 514). In some embodiments, a UI is generated at the processing offloader upon receipt of a first graphics rendering command (or "instruction") from a multimedia device. In other embodiments, the processing offloader generates a UI for multimedia device(s) based on receipt of a request to generate a UI for the multimedia device(s).

A multimedia device (e.g., second multimedia device) may transmit a first UI graphics rendering instruction to the processing offloader (block 516). In some embodiments, the UI graphics rendering instructions may be transmitted from the second multimedia device to the processing offloader via a first multimedia device. The first multimedia device may receive the instructions via an interconnect (e.g., MOCA™ connection) and forward the instructions to the processing offloader based on determining the processing offloader as the destination for the instructions.

Upon receipt of the instructions, the processing offloader may process the instructions and render rendered multimedia information based on the processed instruction. The rendered multimedia information may be utilized by a proxy of a multimedia device (e.g., second multimedia device) to output an updated UI onto an output device.

The second multimedia device may receive rendered multimedia information from the processing offloader (block 518). Upon receipt of the rendered multimedia information representing the rendered UI, the proxy of the of the multimedia device (e.g., second multimedia device) may render a UI and output the rendered UI to an output device.

Processing System

Figure 6:
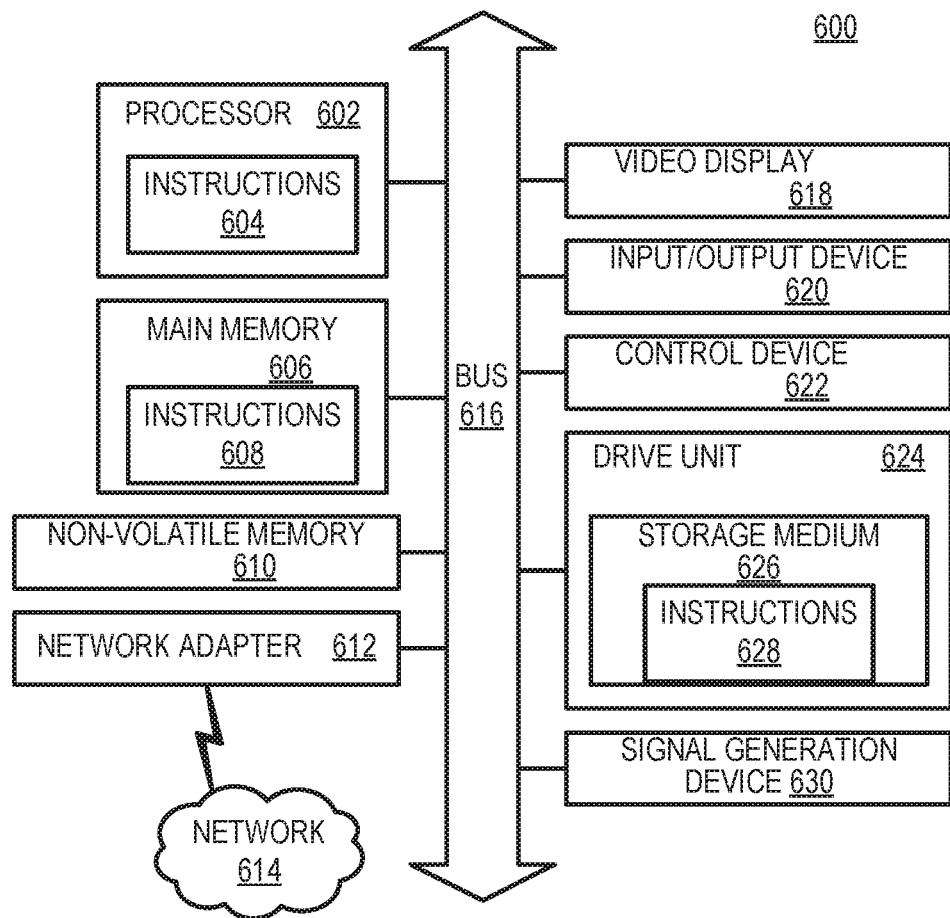
FIG. 6 is a block diagram illustrating an example of a processing system in which at least some operations described herein can be implemented.

FIG. 6 is a block diagram illustrating an example of a processing system 600 in which at least some operations described herein can be implemented. For example, some components of the processing system 600 may be hosted on a computing device (e.g., multimedia device 102, 104, 106 of FIG. 1, processing offloader 108 of FIG. 1, etc.).

The processing system 600 may include one or more central processing units ("processors") 602, main memory 606, non-volatile memory 610, network adapter 612 (e.g., network interface), video display 618, input/output devices 620, control device 622 (e.g., keyboard and pointing devices), drive unit 624 including a storage medium 626, and signal generation device 630 that are communicatively connected to a bus 616. The bus 616 is illustrated as an abstraction that represents one or more physical buses and/or point-to-point connections that are connected by appropriate bridges, adapters, or controllers. The bus 616, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The processing system 600 may share a similar computer processor architecture as that of a desktop computer, tablet computer, personal digital assistant (PDA), mobile phone, game console, music player, wearable field device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the processing system 600.

While the main memory 606, non-volatile memory 610, and storage medium 626 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 628. The term "machine-readable medium" and "storage medium" shall also be taken to include any medium that is capable of storing, encoding, or carrying a set of instructions for execution by the processing system 600.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in a computing device. When read and executed by the one or more processors 602, the instruction(s) cause the processing system 600 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 610, floppy and other removable disks, hard disk drives, optical disks (e.g., Compact Disk Read-Only Memory (CD-ROMS), Digital Versatile Disks (DVDs)), and transmission-type media such as digital and analog communication links.

The network adapter 612 enables the processing system 600 to mediate data in a network 614 with an entity that is external to the processing system 600 through any communication protocol supported by the processing system 600 and the external entity. The network adapter 612 can include a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 612 may include a firewall that governs and/or manages permission to access/proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

Processing Offloader Modules

Figure 7:
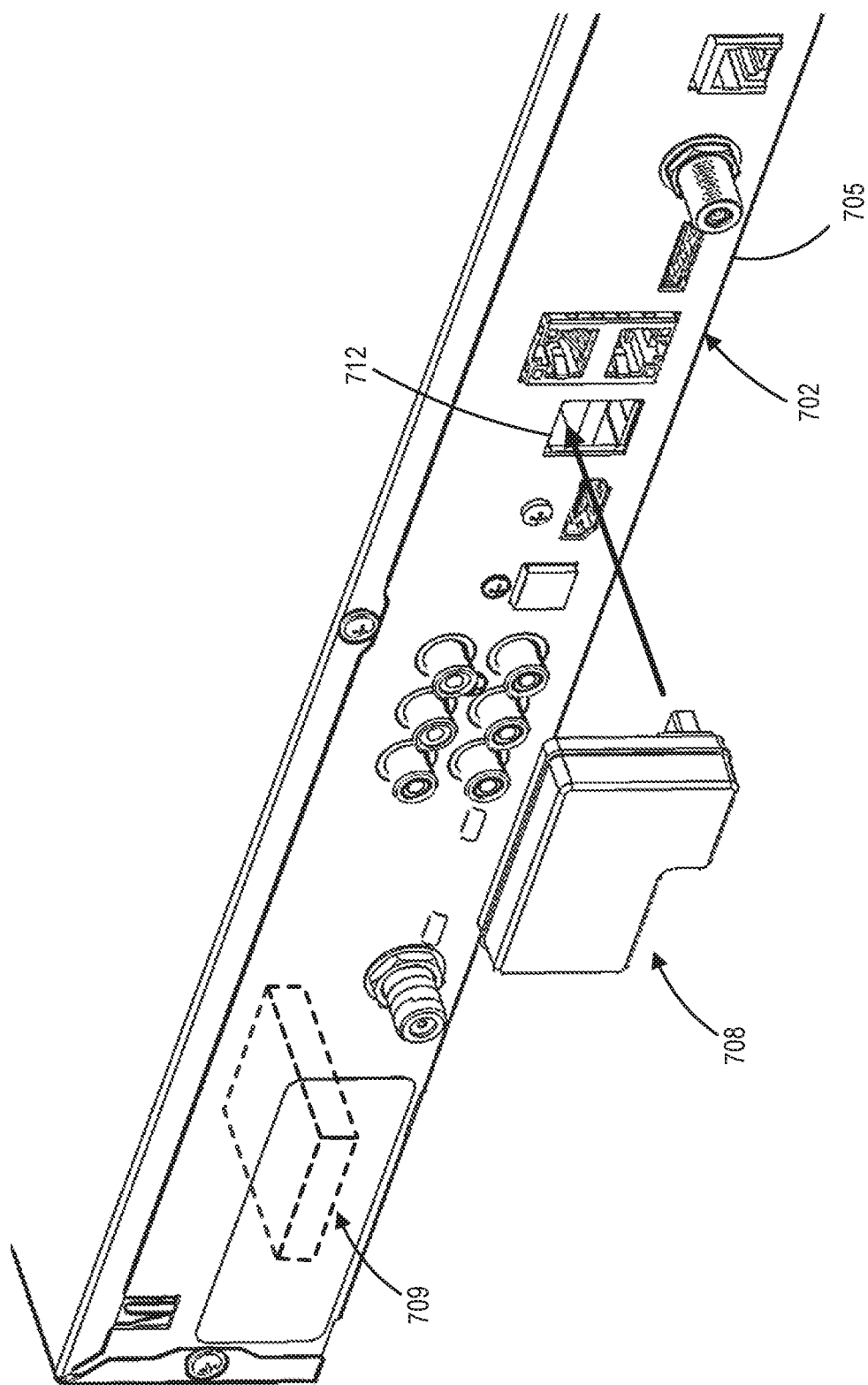
FIG. 7 is a partial perspective view illustrating offloader modules configured in accordance with embodiments of the present technology.

With reference to FIG. 7, an offloader or co-processor module 708 can connect to a first multimedia device, such as a set-top box 702 via a physical connection, such as a USB connection 712, for example. As depicted in the figure, the co-processor module 708 can be a self-contained, externally located device housing an offloader, such as offloader 108 or 208 described above, along with any necessary ancillary components. In some embodiments, an internal co-processor module 709 can be positioned inside a housing 705 of the set-top box 702 and connected via an internal interconnect. For example and without limitation, the internal co-processor module 709 can be connected via any suitable connection, such as a USB connector, an existing test or diagnostic connection, or daisy chained to an existing internal cable connection. In some embodiments, both an external co-processor module 708 and an internal co-processor module 709 can be connected to the set-top box 702. Although various embodiments herein have been described as connecting the offloader or co-processor to the first multimedia device, the offloader can be connected to the second and/or third multimedia devices in lieu of or in addition to connecting the offloader to only the first multimedia device.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A method for supplementing the processing capabilities of multimedia devices in a networked environment, the method comprising:
    providing a processing offloader module configured to physically connect to a first multimedia device in the networked environment, wherein the processing offloader module is an external processing offloader module configured to connect to the first multimedia device via an external interconnect;
    identifying the processing offloader module, comprising:
        transmitting a first communication to the processing offloader module indicating a request to provide an identification indicator identifying the processing offloader module to the first multimedia device; and
        identifying the processing offloader module based on receiving a second communication that includes the identification indicator identifying the processing offloader module;
    identifying a second multimedia device in the networked environment;
    determining, by a processor, that a processing bandwidth of the second multimedia device falls below a threshold bandwidth, wherein the processing bandwidth of the second multimedia device indicates available processing resources of the second multimedia device;
    forwarding instructions from the second multimedia device to the processing offloader module based on determining that the processing bandwidth of the second multimedia device exceeds the threshold bandwidth, wherein the processing offloader module is configured to process the instructions and render multimedia information based on the instructions;
    transmitting a third communication to the second multimedia device indicating a request to enable a proxy configured to output received rendered multimedia information;
    forwarding the rendered multimedia information from the processing offloader module to the second multimedia device;
    transmitting a fourth communication to the second multimedia device to disable a native UI executing on the second multimedia device based on determining that the bandwidth of a second multimedia device falls below the threshold bandwidth; and
    transmitting a fifth communication to the processing offloader module to generate a second multimedia device UI at the processing offloader module, where the second multimedia device UI is associated with the second multimedia device and configured to process received instructions transmitted by the second multimedia device.

2. The method of claim 1, wherein the external interconnect comprises a USB connection.

3. The method of claim 1, further comprising:
    identifying the processing bandwidth of the second multimedia device by comparing utilized processing resources and maximum processing resources of the second multimedia device,
    wherein said determining that the processing bandwidth of the second multimedia device exceeds the threshold bandwidth includes determining that a differential between the utilized processing resources and the maximum processing resources of the second multimedia device falls below the threshold bandwidth.

4. The method of claim 1, further comprising:
identifying a processing bandwidth of the processing offloader module by comparing a utilized processing resources and a maximum processing resources of the processing offloader module,
wherein said forwarding instructions from the second multimedia device to the processing offloader module is based on a differential between the utilized processing resources and the maximum processing resources of the processing offloader module exceeding a threshold processing offloader bandwidth.

5. The method of claim 1, further comprising:
identifying a third multimedia device in the networked environment;
determining that the processing bandwidth of the second multimedia device is less than a processing bandwidth of the third multimedia device; and
forwarding instructions from the second multimedia device to the processing offloader module based on determining that the processing bandwidth of the second multimedia device is less than the processing bandwidth of the third multimedia device.

6. The method of claim 5, further comprising:
determining, by the processor, an updated processing bandwidth of the processing offloader module indicating available processing resources of the processing offloader module upon receipt of instructions from the second multimedia device; and
forwarding instructions from the third multimedia device to the processing offloader module based on a differential between the updated processing bandwidth of the processing offloader module and a maximum bandwidth of the processing offloader module exceeding a threshold processing offloader bandwidth.

7. A multimedia system, comprising:
a first multimedia device and a second multimedia device in a networked environment; and
a processing offloader module, wherein said processing offloader module is an internal processing offloader module physically connected inside the first multimedia device;
wherein the first multimedia device includes a processor and a memory that includes instructions for discovering the processing offloader module, wherein the instructions, when executed by the processor, cause the processor to:
transmit a first communication to the processing offloader module indicating a request to provide an identification indicator identifying the processing offloader module; and
identify the processing offloader module based on receiving a second communication that includes the identification indicator identifying the processing offloader module;
determine that a processing bandwidth of the second multimedia device falls below a threshold bandwidth;
forward instructions from the second multimedia device to the processing offloader module based on determining that the processing bandwidth of the second multimedia device exceeds the threshold bandwidth;
transmit a third communication to the second multimedia device indicating a request to enable a proxy configured to output the rendered multimedia information;
forward rendered multimedia information received from the processing offloader module to the second multimedia device;
transmit a fourth communication to the second multimedia device to disable a native UI executing on the second multimedia device based on determining that the bandwidth of a second multimedia device falls below the threshold bandwidth; and
transmit a fifth communication to the processing offloader module to generate a second multimedia device UI at the processing offloader module, where the second multimedia device UI is associated with the second multimedia device and configured to process received instructions transmitted by the second multimedia device.

8. The system of claim 7, further comprising an external processing offloader module physically connectable to one of the first multimedia device or the second multimedia device via an external interconnect.

9. The system of claim 7, wherein the processor is further configured to:
compare a utilized processing resources and a maximum processing resources of the processing offloader module to identify a processing bandwidth of the processing offloader module,
wherein said forward instructions from the second multimedia device to the processing offloader module is based on a differential between the utilized processing resources and the maximum processing resources of the processing offloader module exceeding a threshold processing offloader bandwidth.

10. The system of claim 7, wherein the processor is further configured to:
identify a third multimedia device;
determine that the processing bandwidth of the second multimedia device is less than a processing bandwidth of the third multimedia device; and
forward instructions from the second multimedia device to the processing offloader module based on determining that the processing bandwidth of the second multimedia device is less than the processing bandwidth of the third multimedia device.

11. The system of claim 10, wherein the processor is further configured to:
determine an updated processing bandwidth of the processing offloader module indicating available processing resources of the processing offloader module upon receipt of instructions from the second multimedia device; and
forward instructions from the third multimedia device to the processing offloader module based on a differential between the updated bandwidth of the processing offloader module and a maximum bandwidth of the processing offloader module exceeding a threshold processing offloader bandwidth.

12. A multimedia device, comprising:
a housing:
a processing offloader module physically connected inside the housing;
an external processing offloader module physically connected to the multimedia device via an external interconnect; and
a processor and a memory that includes instructions for discovering the processing offloader module positioned inside the housing, wherein the instructions, when executed by the processor, cause the processor to:

transmit a first communication to the processing offloader module indicating a request to provide an identification indicator identifying the processing offloader module; and identify the processing offloader module based on receiving a second communication that includes the identification indicator identifying the processing offloader module;

determine that a processing bandwidth of the multimedia device falls below a threshold bandwidth;

forward instructions from the multimedia device to the processing offloader module based on determining that the processing bandwidth of the multimedia device exceeds the threshold bandwidth;

transmit a third communication to the multimedia device indicating a request to enable a proxy configured to output the rendered multimedia information;

forward rendered multimedia information received from the processing offloader module to the multimedia device;

transmit a fourth communication to the second multimedia device to disable a native UI executing on the second multimedia device based on determining that the bandwidth of a second multimedia device falls below the threshold bandwidth; and transmit a fifth communication to the processing offloader module to generate a second multimedia device UI at the processing offloader module, where the second multimedia device UI is associated with the second multimedia device and configured to process received instructions transmitted by the second multimedia device.

* * * * *